US011636061B2

(12) United States Patent
Srinivasan et al.

(10) Patent No.: US 11,636,061 B2
(45) Date of Patent: Apr. 25, 2023

(54) ON-DEMAND PACKETIZATION FOR A CHIP-TO-CHIP INTERFACE

(71) Applicant: XILINX, INC., San Jose, CA (US)

(72) Inventors: Krishnan Srinivasan, San Jose, CA (US); Sagheer Ahmad, Cupertino, CA (US); Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/464,642

(22) Filed: Sep. 1, 2021

(65) Prior Publication Data
US 2023/0066736 A1 Mar. 2, 2023

(51) Int. Cl.
*G06F 13/42* (2006.01)
*G06F 13/40* (2006.01)

(52) U.S. Cl.
CPC .......... *G06F 13/42* (2013.01); *G06F 13/4027* (2013.01)

(58) Field of Classification Search
CPC .............................. G06F 13/42; G06F 13/4027
See application file for complete search history.

(56) References Cited

U.S. PATENT DOCUMENTS

| 8,972,828 B1* | 3/2015 | Margalit | H03M 13/333 |
| | | | 714/776 |
| 2005/0012638 A1* | 1/2005 | Barbir | G08C 19/00 |
| | | | 340/870.01 |
| 2005/0055464 A1 | 3/2005 | Weller | |
| 2007/0033337 A1* | 2/2007 | Butt | G11C 7/22 |
| | | | 711/167 |
| 2015/0180799 A1 | 6/2015 | Lovett et al. | |
| 2017/0006360 A1* | 1/2017 | Gareau | H04L 49/351 |
| 2020/0012555 A1 | 1/2020 | Das Sharma | |
| 2020/0412586 A1* | 12/2020 | McLoughlin | H04B 10/0775 |

OTHER PUBLICATIONS

Swarbrick, Ian et al. "Network-on-Chip Programmable Platform in Versal™ ACAP Architecture" Proceedings of the 2019 ACM/SIGDA International Symposium on Field-Programmable Gate Arrays (2019).

* cited by examiner

*Primary Examiner* — Henry Tsai
*Assistant Examiner* — Christopher A Daley
(74) *Attorney, Agent, or Firm* — Patterson + Sheridan, LLP

(57) ABSTRACT

Embodiments herein describe on-demand packetization where data that is too large to be converted directly into data words (DWs) for a chip-to-chip (C2C) interface are packetized instead. When identifying a protocol word that is larger than the DW of the C2C interface, a protocol layer can perform packetization where a plurality of protocol words are packetized and sent as a transfer. In one embodiment, the protocol layer removes some or all of the control data or signals in the protocol words so that the protocol words no longer exceed the size of the DW. These shortened protocol words can then be mapped to DWs and transmitted as separate packets on the C2C. The protocol layer can then collect the portion of the control data that was removed from the protocol words and transmit this data as a separate packet on the C2C interface.

20 Claims, 6 Drawing Sheets

ON-DEMAND PACKETIZATION FOR A CHIP-TO-CHIP INTERFACE

TECHNICAL FIELD

Examples of the present disclosure generally relate to on-demand packetization for transferring data across a chip-to-chip interface where the data word being transferred exceeds the number of wires in the interface.

BACKGROUND

As computer systems become more closely integrated, chip-to-chip (C2C) interfaces are more widely used. One such computing system is an anchor chip (e.g., a processor, application specific integrated circuit (ASIC), field programmable gate array (FPGA), or system on a chip (SOC) that uses C2C interfaces to communicate with one or more chiplets (e.g., high speed I/O or high bandwidth memory (HBM)). In order to achieve the chiplet based architecture, the C2C interface must be defined clearly. C2C interfaces are constrained by the area of the beachfront (e.g., the sides of the anchor chip) which limits the number of signals and wires that can pass through the interface. The required bandwidth is therefore achieved by running the interface at a high data rate.

However, the data protocol used by the application circuitry executing in chips may have a different word size than the size of the data words (DW) supported by the C2C interface. If the data protocol has a word size greater than the DW used by the C2C interface, than the chip cannot perform a one-to-one mapping between the protocol word and the DW. Instead, a single protocol word may be subdivided and sent across the C2C interface as multiple DWs. However, the protocol word may be only slightly larger than the DW, which means much of the bandwidth of the C2C is wasted. Another approach is to restrict the functionality of the bus-interface so that less data must be sent across the C2C, but reducing functionality might not be an option.

SUMMARY

One embodiment describes an integrated circuit that includes application circuitry, a chip-to-chip (C2C) interface and a protocol layer connected between the application circuitry and the C2C interface. The protocol layer is configured to receive a plurality of protocol words from the application circuitry, to be transmitted on the C2C interface, that each exceeds a size of a data word (DW) supported by the C2C interface and packetize the plurality of protocol words by mapping subportions of the plurality of protocol words to separate DWs where each of the subportions are equal to, or less than, the size of the DW and generating at least one DW that contains the remaining portions of the plurality of protocol words not included in the subportions.

Another embodiment described herein is a system that includes a first integrated circuit connected via a chip-to-chip (C2C) interface to a second integrated circuit where the first integrated circuit includes a protocol layer connected between application circuitry and the C2C interface. The protocol layer is configured to receive a plurality of protocol words from the application circuitry, to be transmitted on the C2C interface, that each exceeds a size of a data word (DW) supported by the C2C interface and packetize the plurality of protocol words mapping subportions of the plurality of protocol words to separate DWs where each of the subportions are equal to, or less than, the size of the DW and generating at least one DW that contains the remaining portions of the plurality of protocol words not included in the subportions.

Another embodiment described herein is a method that includes receiving, at a protocol layer in an integrated circuit, a plurality of protocol words to be transmitted on a C2C interface where each of the plurality of protocol words exceeds a size of a data word (DW) supported by the C2C interface and packetizing the plurality of protocol words by mapping subportions of the plurality of protocol words to separate DWs where each of the subportions are equal to, or less than, the size of the DW and generating at least one DW that contains the remaining portions of the plurality of protocol words not included in the subportions.

BRIEF DESCRIPTION OF DRAWINGS

So that the manner in which the above recited features can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
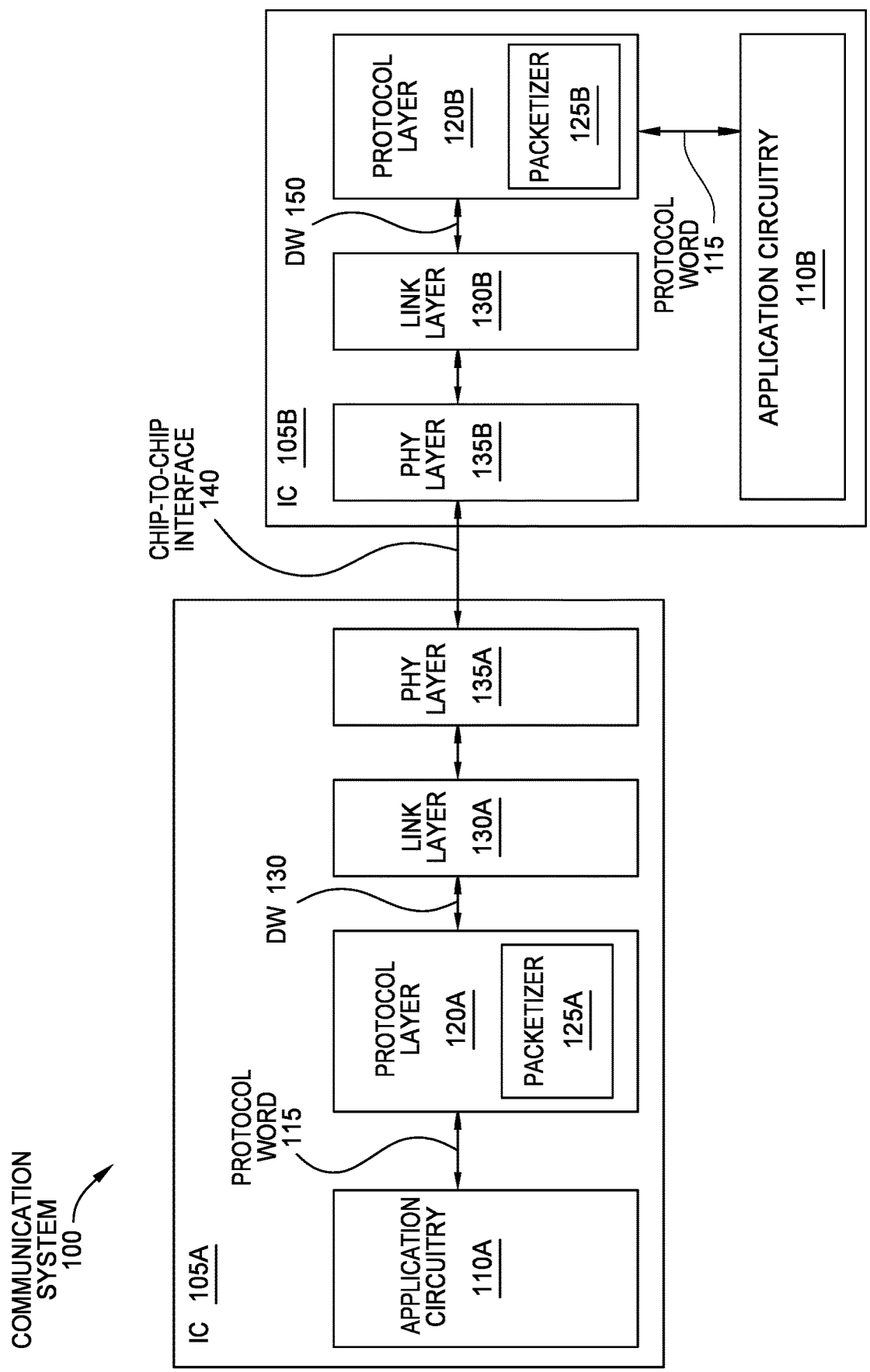
FIG. 1 is a block diagram of a communication system with packetizers to perform on-demand packetization for a chip-to-chip interface, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe on-demand packetization where data that is too large to be converted directly into DWs for a C2C interface are packetized instead. For example, because of limited wires, the C2C may be able to support a DW of only 288 bits, but the protocol (e.g., a data streaming protocol) may generate words that are 300 bits. The protocol words could be mapped to two DWs when transmitted on the C2C interface, but that would mean 576 bits of the C2C interface are used to transmit only 300 bits, resulting in a 52% utilization of the bandwidth of the C2C interface. Instead, when identifying a protocol word that is larger than the DW of the C2C interface, a protocol layer can perform packetization where a plurality of protocol words are packetized and sent as a transfer. In one embodiment, the protocol layer removes some or all of the control data or signals in the protocol words (e.g., strobe signals, redundancy bits, error correction bits, flags, etc.) so that the protocol words no longer exceed the size of the DW. These shortened protocol words can then be mapped to DWs and transmitted as separate packets on the C2C. The protocol layer can then collect the portion of the control data that was removed from the protocol words and transmit this data as a separate packet on the C2C interface. While this may introduce some latency (since the receiving chip must wait for the control bits to be received before it can reconstruct the protocols words), it reduces the amount of bandwidth that is wasted in the C2C interface.

In another embodiment, instead of packetizing large protocol words, the protocol layer can encode the control data to reduce the size of the protocol words so they are equal to, or smaller than, the size of the DWs. For example, the control data may have a series of consecutive ones or zeros. Instead of storing each one or zero, the protocol layer can just encode the protocol word to indicate where the series begins or ends. However, if the protocol layer is unable to encode the protocol word so that it is smaller than the DW, then packetization can be used.

FIG. 1 is a block diagram of a communication system 100 with packetizers 125 to perform on-demand packetization for a C2C interface 140, according to an example. As shown, the system 100 includes integrated circuits (ICs or chips) 105A and 105B. The communication system 100 can be an anchor-chiplet system, or any other system where two ICs communicate directly using a C2C interface. The ICs 105 can be ASICs, FPGAs, SoCs, CPUs, memories, etc. One IC 105 can be a primary IC while the other is a secondary IC, or the ICs 105 may be peers. In one embodiment, the ICs 105 may be disposed side-by-side on the same substrate, or they may be arranged in a stacked formation.

In this example, each IC 105 includes similar components: application circuitry 110, a protocol layer 120, a link layer 130, and a physical (PHY) layer 135. The application circuitry 110 represents any circuitry that performs a user function. The circuitry 110 can include non-programmable (hardened) circuitry, such as a processor core, data processing engine, graphics processing unit, and the like. Or the circuitry 110 can include programmable circuitry, such as configurable logic blocks (CLBs) or other types of programmable logic that can be customized by a user on the fly. In any case, the application circuitry 110 generates data that is transferred to the other IC 105 using the C2C interface 140.

The application circuitry 110 uses a specific protocol to transmit data to other hardware elements in the IC 105—e.g., the protocol layer 120. The protocol is often different than the protocol used to transmit data on the C2C interface 140. When transmitting data received from the application circuitry 110 on the C2C interface 140, the protocol layer 120 performs a conversion to map a protocol word 115 that is compatible with the protocol used by the application circuitry 110 to a DW 150 that is compatible with the C2C interface 140. The embodiments herein are not limited to any specific type of protocol, but rather can be applied to any IC where internal circuitry uses a communication protocol that is different from, or not compatible with, the C2C interface 140. For example, the application circuitry 110 may use a data protocol such as Advanced eXtensible Interface (AXI), AXI streaming, Advanced Microcontroller Bus Architecture (AMBA-CXS), or peripheral component interconnect express (PCIe).

The protocol layers 120 include packetizers 125 for converting protocol words 115 to DW 150 and DW 150 to protocols words 115. Although discussed in more detail below, in general the packetizers 125 (e.g., circuitry in the protocol layer 120) remove some or all of the control data of the protocol words 115 so the resulting shortened protocol words 115 can be mapped one-to-one to DWs 150. The removed control data can then be sent in a separate packet (e.g., another DW 150). The packetizer 125 in the receiving IC 105 can then reconstruct the protocol words 115 from the packets (e.g., the DWs 150) and transmit the protocol words 115 to the application circuitry. In this manner, the bandwidth of the C2C interface 140 may be more efficiently used relative to mapping one protocol word 115 to two or more DWs 150.

The ICs 105 also include link layers 130 and PHY layers 135 for communicating along the C2C interface 140. As mentioned above, the C2C interface 140 may have limited real estate to form wire connections between the ICs 105. As a result, the size (e.g., number of bits) in the DW 150 may be less than the size of the protocol word 115. But packetization can be performed in order to reduce the size of the protocol words 115 in an efficient way to maximize the bandwidth of the C2C interface.

Figure 2:
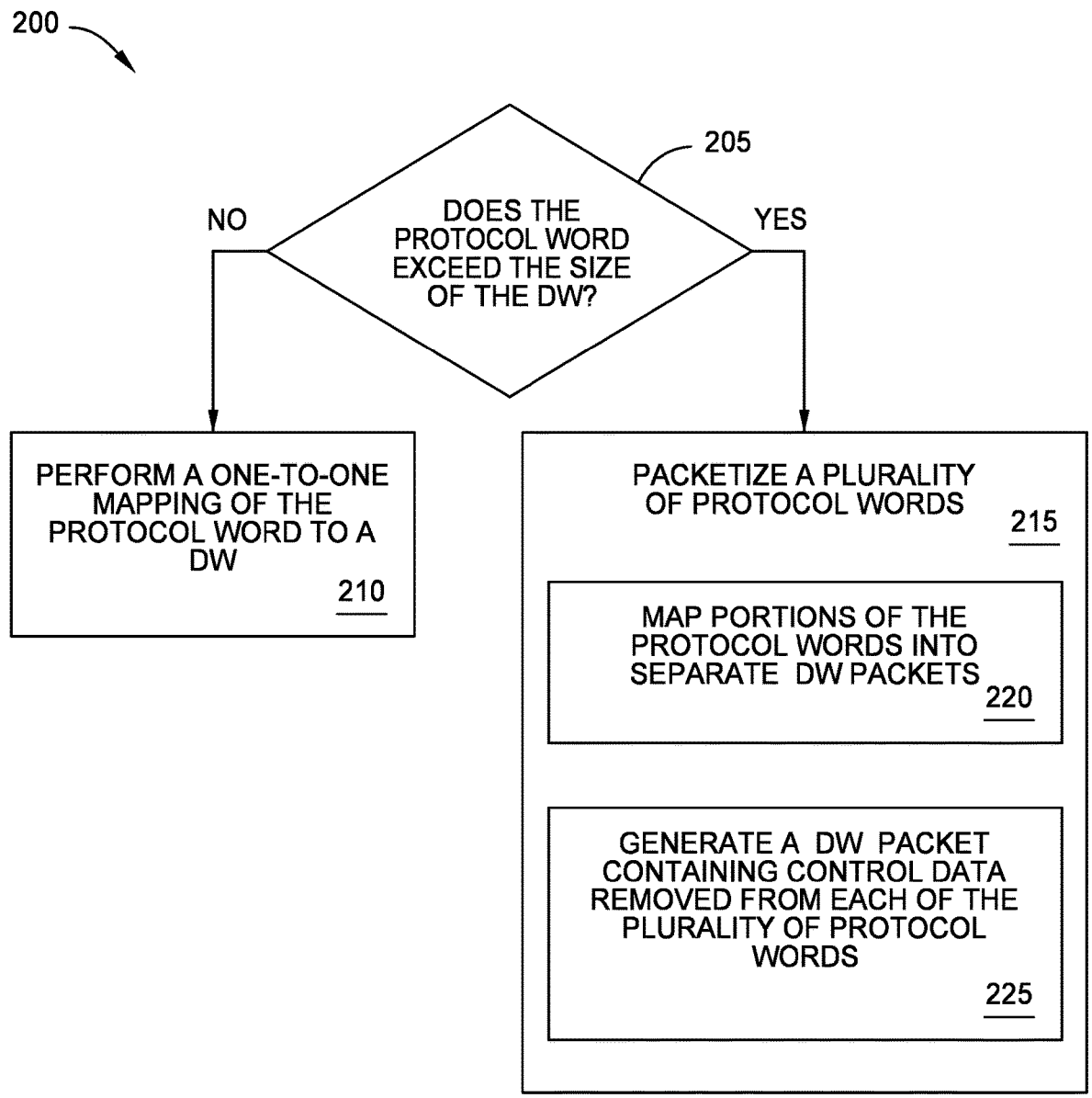
FIG. 2 is a flowchart for performing on-demand packetization, according to an example.

FIG. 2 is a flowchart of a method 200 for performing on-demand packetization, according to an example. At block 205, the packetizer in the protocol layer determines whether a protocol word received from the application circuitry exceeds the size of the DWs that are used to transmit data across the C2C interface. In this embodiment, the protocol words sometimes are larger than the DWs, but other times, are not. For example, some protocol words may have more data, or more control bits, than other protocol words. In another example, the application circuitry may use two different protocols to transmit data to the protocol layer, where one protocol (e.g., a streaming protocol) has protocol words that exceed the size of the DW but the other protocol (e.g., a memory mapped protocol) does not.

If the protocol word does not exceed the size of the DW, at block 210, the packetizer performs a one-to-one mapping of the protocol word to a DW. That is, all the bits in the protocol word can be mapped to a corresponding bit in the DW. As a result, the protocol word can be transmitted in a single DW across the C2C interface.

However, if the protocol word exceeds the size of the OW, at block 215 the packetizer packetizes a plurality of protocol words. That is, the packetizer shortens the protocol words by removing all or a portion of the control data/bits in the words so that shortened protocol words can be mapped to corresponding DWs and transmitted on the C2C interface.

This packetization can be expressed in two blocks, where at block 220, the packetizer maps data portions of the protocol words into separate DW packets. For example, the packetizer can remove all of the control bits from the protocol words so that these words now contain only the data bits (e.g., the user or application data) and are equal to, or smaller than, the DWs. As a result, these protocol words can now be mapped one-to-one with DWs.

In another example, the packetizer can remove only a portion of the control bits (e.g., strobe signals) but leave other types of control bits (e.g., error redundancy bits) so that the protocol words contain the remaining portion of the control bits as well as the data bits or user data. Again, this assumes that removing the portion of the control bits shrinks the protocol words sufficiently so they are equal to, or smaller than the DWs. Whether all or only a portion of the control data/bits are removed, the shortened protocol words can then be mapped to DWs and sent as respective packets.

At block 225, the packetizer generates a DW packet containing the control data removed from each of the plurality of protocol words at block 220. That is, the packetizer can collect the control data/bits removed from all the protocol words at block 220 and then transmit this control data in its own packet (e.g., DW) across the C2C interface. Blocks 220 and 225 are illustrated in FIG. 3.

Figure 3:
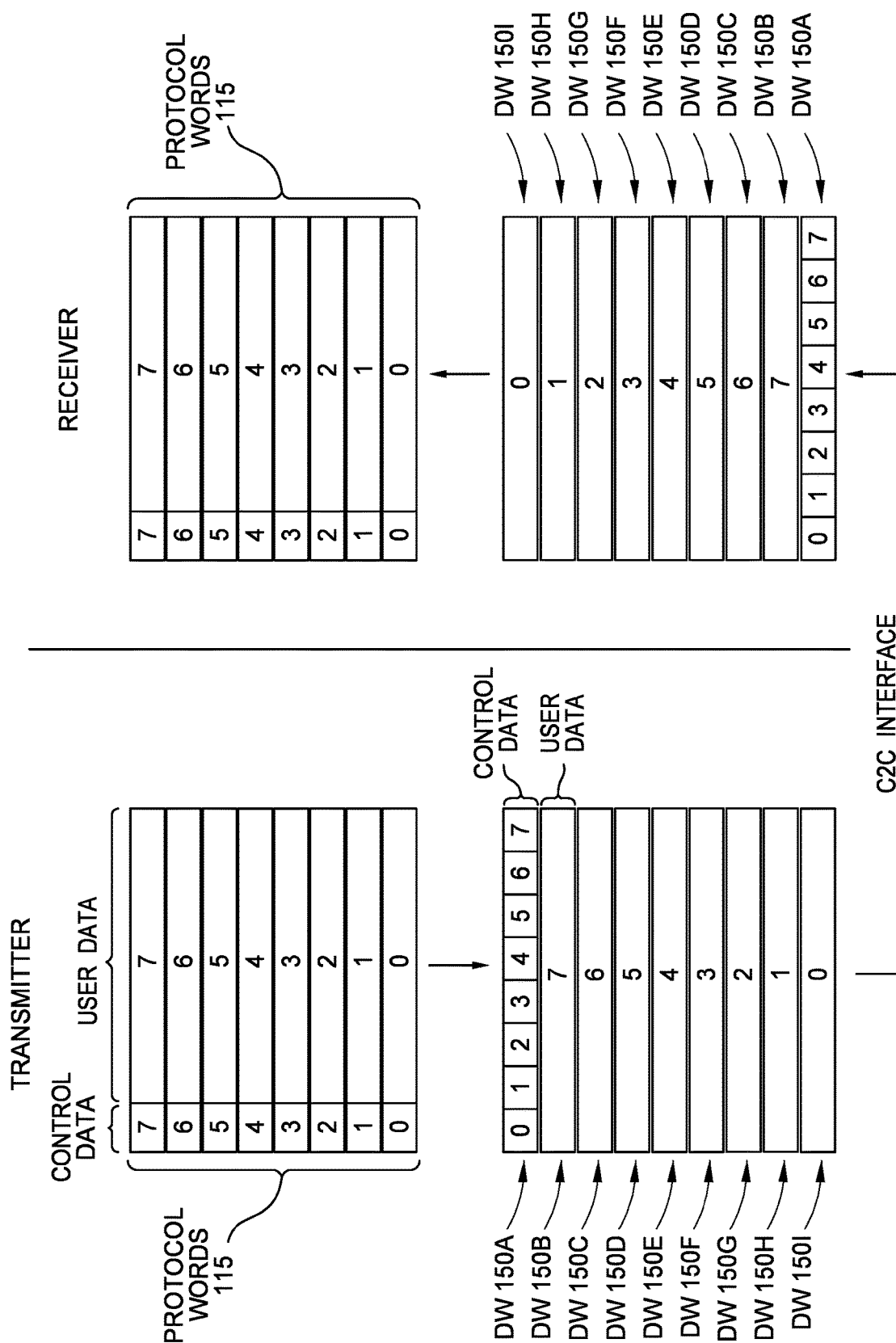
FIG. 3 illustrates packetizing data transmitted across a C2C interface, according to an example.

FIG. 3 illustrates packetizing data transmitted across a C2C interface, according to an example. In this example, a transmitter (e.g., one of the ICs 105 in FIG. 1) wants to transmit eight protocol words 115 to a receiver (e.g., the other one of the ICs 105 in FIG. 1). Each of the protocol words 115 includes control data and user data. It assumed that the total size of each protocol word 115 (the control data plus the user data) exceeds the size of the DW supported by the C2C interface.

To reduce the size of the protocol words 115 so they can be mapped to DWs, the packetizer removes the control data from each of the protocol words 115. As shown in bottom left of FIG. 3, the packetizer then sends the user data (e.g., the data portion) of the protocol words 115 as separate DWs (i.e., DWs 150B-150I). The packetizer also collects the control data removed from the protocol words 115 and transmits it as a separate packet (i.e., DW 150A). In this manner, the eight protocol words 115 are packetized and transmitted as nine DWs 150A-1 on the C2C interface.

While FIG. 3 illustrates removing all of the control data, as mentioned above, the packetizer may only have to remove some of the control data in order to sufficiently reduce the size of the protocol words 115 to perform a one-to-one mapping with the DWs. Further, the number of protocol words 115 that are packetized as a group (where their control data is collected) can be a user set attribute. FIG. 3 illustrates packetizing eight protocol words 115, but in other embodiments, 4 or 16 protocol words 115 may be collected and packetized. For instance, the packetizer may receive four protocol words, remove some or all of the control data from those words, and transmit five (or six) DWs on the C2C interface where one of those five DWs (or two of the six DWs) includes the control data.

The right side of FIG. 3 illustrates the receiver receiving the nine DWs 150A-1 at the protocol layer. To convert the DWs 150 back into the same protocol words 115 generated by the transmitter, the packetizer has to receive the DW 150A containing the control data. Once this packet is received, the packetizer can reconstruct the protocol words 115 by combining the control data in the DW 150A with the corresponding user data in the DWs 150B-I.

Performing packetization can result in improved bandwidth utilization relative to, for example, mapping each of the protocol words to two DWs. In that case, the C2C interface would have to transmit 16 DWs for the eight protocol words 115. While packetization can inject some additional latency (since the packetizer has to wait for the DW 150A containing the control data in order to convert the DWs 150B-1 back into the protocol words 115), the C2C interface only has to transmit nine DWs, which saves bandwidth that can be used to transmit other protocol words (e.g., another batch of eight protocol words).

Figure 4:
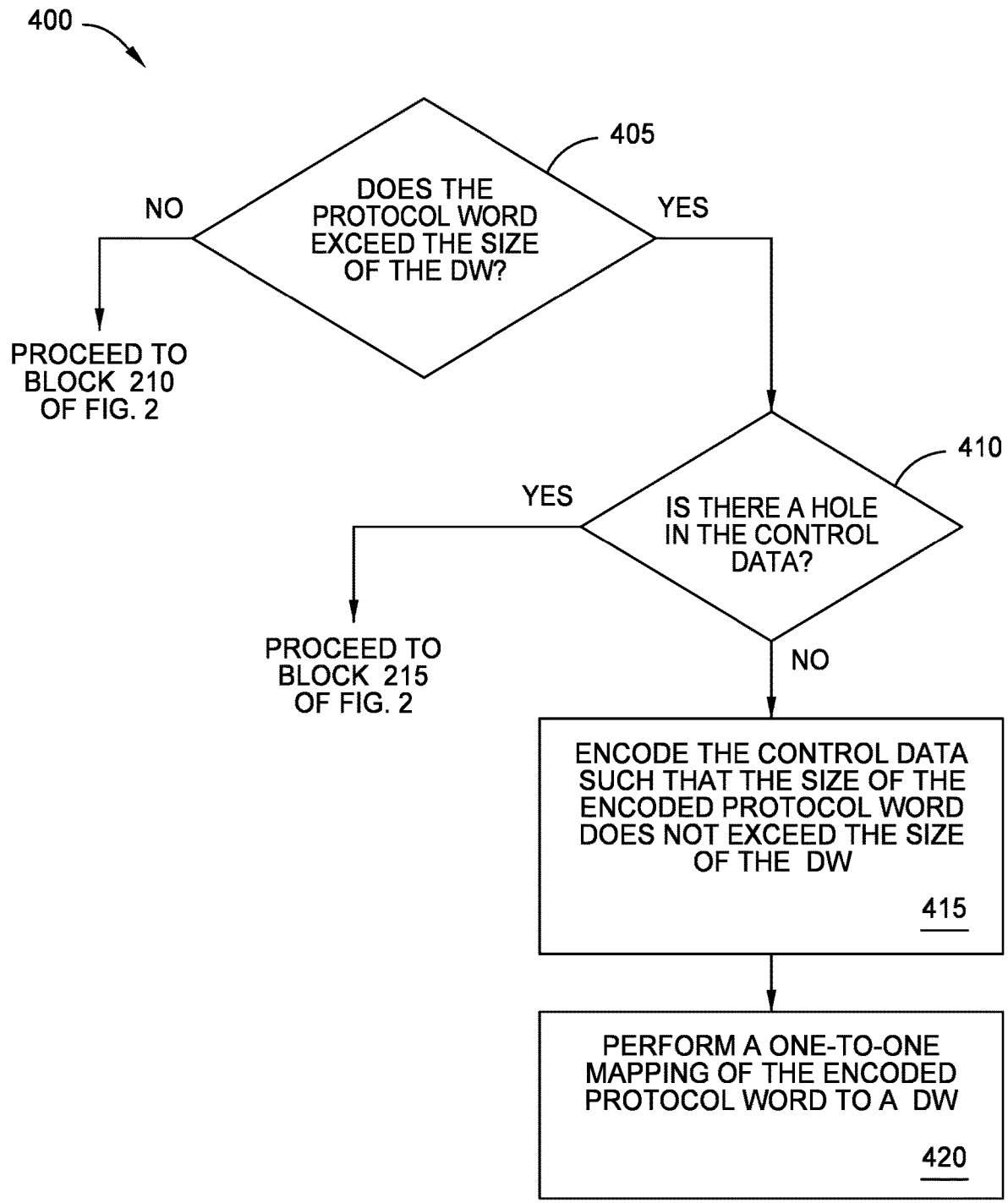
FIG. 4 is a flowchart for encoding control signals to avoid packetization, according to an example.

FIG. 4 is a flowchart of a method 400 for encoding control signals to avoid packetization, according to an example. While packetization can improve performance relative to mapping protocol words to multiple DWs, it does add latency. Thus, it may be advantageous to encode the control data in a protocol word so the size of the protocol word is equal to, or less than, the size of the DW since doing so would permit a one-to-one mapping and avoid the latency associated with packetization. The method 400 illustrates a packetizer that can encode the control data.

At block 405, the packetizer determines whether the protocol word exceeds the size of the DW. This can be similar to block 205 in the method 200 where on some occasions the protocol word may be larger than the DW, but other times the protocol word may be equal to or smaller than the DW. If the protocol word is equal to or smaller than the DW, the method 400 proceeds to block 210 of method 200 where the protocol word is transmitted using a one-to-one mapping. Otherwise, the method 400 proceeds to block 410 where the packetizer determines whether there is a hole in the control signal. Stated differently, the packetizer determines whether the control data in the protocol word can be encoded into a smaller size. In general, if the control data includes a hole—e.g., a series of ones bordered on both sides by zeros, or a series of zeroes bordered on both sides by ones, or a series of ones ends in a non-last word of transfer of a plurality of protocol words, or a series of ones starts in the last word of a transfer of a plurality of protocol words—this means the control data cannot be encoded. In that case, the method 400 proceeds to block 215 of the method 200 where packetization is performed like shown in FIG. 3.

Figure 5:
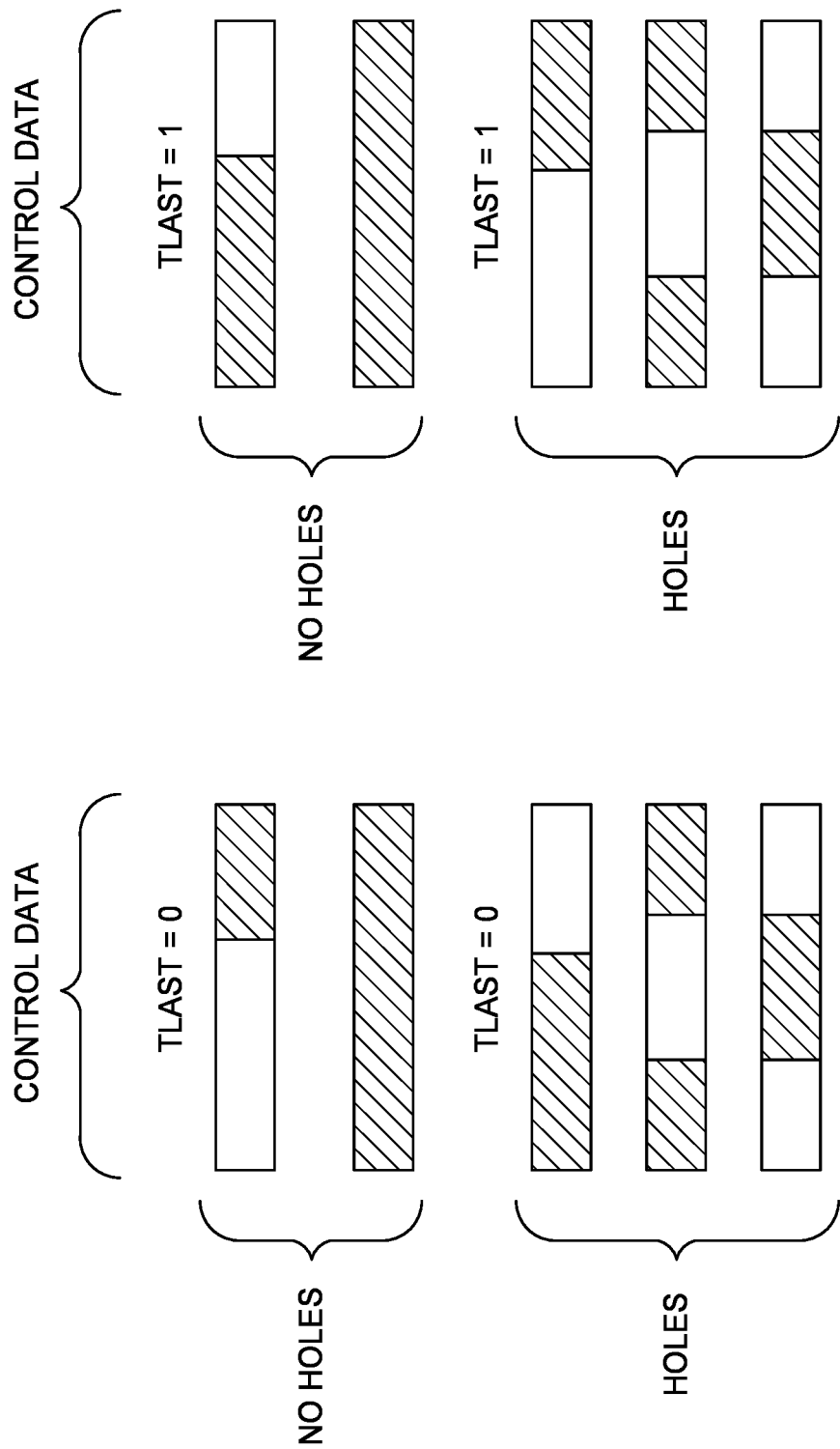
FIG. 5 illustrates control signals that can and cannot be encoded, according to an example.

FIG. 5 illustrates control data that can and cannot be encoded, according to an example. That is, FIG. 5 illustrates control data in a transfer of protocol words that have holes, and control data that does not have holes. The control data in FIG. 5 is strobe signals in AXI-Streaming, but the embodiments herein can be applied to any protocol that has control data with a series of ones or zeros (e.g., an identifiable pattern). In this example, the portion of the control data with hatching indicate "ones" (valid bits) while the empty portion of the control data indicate "zeros" (invalid bits). Further, the embodiments can also be applied to any protocol that has control data with other types of identifiable patterns. For example, the control data may have one or more patterns of ones and zeros (e.g., 0011001100) which could be encoded using fewer bits. Thus, the embodiments are not limited to control data containing a series of ones or zeros.

The top four examples in FIG. 5 illustrate control data for a transfer of protocol words that do not have holes. In these examples, the control data can be encoded or compressed. For example, instead of transmitting all the bits in the control data, the DW can just indicate the location of the first valid byte location in the non-last protocol word in the transfer (i.e., when TLAST is 0), or the location of the first invalid byte in the last protocol word in the transfer (i.e., when TLAST is 1). A flag bit can be used to indicate when all the bytes of data in the control data for the transfer are valid. In this manner, when there are no holes in the strobe signals, the DW only needs a few bits (e.g., 32 bits or less) to encode or represent all of the control data. This encoding or compression of the control data may be enough to reduce the size of the protocol word so that a one-to-one mapping can be performed between encoded protocol word and the DW. For example, if the protocol word is 300 bits but the DW is 288, encoding the control data in the protocol word may reduce it to 288 bits or less so that each bit can be mapped to a corresponding bit of the DW.

The bottom six examples in FIG. 5 illustrate examples where there are holes in the control data, which means the control data cannot be encoded or compressed. Using AXI-streaming as an example, a transfer of protocol words has a hole if one or more of the following conditions are false:

TLAST==0 and TKEEP[W−1]==0

TKEEP[N−1:0] are all 1s, and TKEEP[M−1:N+K] are all 1s and TKEEP[N+K−1:N] are all 0s where K>=1, M>N+1, M<=W TKEEP[N−1:0] are all 0s, and TKEEP[M−1:N+K] are all 0s and TKEEP[N+K−1:N] are all 1s where K>=1, M>N+1, M<=W TLAST==1 and TKEEP[0]==0 where W is the width of the TKEEP signal at the AXI-S interface, M is the data bits in the protocol word, and N is the control bits in the protocol word.

Returning to the method 400, assuming there are no holes in the transfer (e.g., a group of protocol words), the method 400 proceeds to block 415 where the packetizer encodes the control data such that the size of the encoded protocol word(s) does not exceed the size of the DW. Using the example in FIG. 5, some bits of the DW are used to indicate the location of the first valid byte location in the non-last protocol word in the transfer, or the location of the first invalid in the last protocol word in the transfer. A flag bit can be used to indicate when all the bytes of data in the control data for the transfer are valid.

At block 420, the packetizer can perform a one-to-one mapping for the encoded protocol word(s) in the transfer to respective DWs. As a result, the encoded protocol words can be transmitted on the C2C with the same efficiency as a protocol word that original did not exceed the size of the DW. Thus, encoding the protocol words avoids the latency introduced by packetization.

Encoding the protocol words can be described mathematically. Assume the protocol (e.g., bus-interface) transmits words to the protocol layer that include M data bits (e.g., user data) and N control bits. Suppose the DW has D wires that are available. The problem is stated as follows: Given that M+N>D, M<D, N<D, define a method to restrict N to K under restricted functionality such that M+K≤D, and define a method to packetize N when N cannot be restricted to K, so that the desired trade-off between bandwidth and latency can be achieved. When a transfer arrives such that N cannot be compressed to K, the packetizer packetizes the transfer as shown by the "YES" result of the block 410. Packetization can be expressed as follows: Let R be a positive integer such that N*R≤D−1<N*(R+1). The packetizer accumulates R transfers, strips the N control bits and accumulates them separately in a register. Once the R transfers have been accumulated, the packetizer sends the "header" flit, which would be the R control bits, followed by the R transfers. This is illustrated in FIG. 3 above.

Otherwise, if N can be compressed to K, then the packetizer compresses the protocol words so that these encoded words can be mapped one-to-one with the DWs. This is illustrated by blocks 415 and 420 in the method 400.

Further, the method 400 can be modified to be used with a protocol that always generates protocol words that exceed the size of the DW. In that case, the logic of block 405 can be omitted since the protocol words are always larger than DW. However, the packetization is still "on-demand" since the packetizer can determine, on the fly, whether the protocol words can be encoded or compressed (e.g., when the control data does not have a hole), and if so, transmit the encoded protocol words without performing packetization. If, however, the protocol words cannot be compressed or encoded such that their size is reduced to be equal to, or less than, the size of the DW, then packetization is performed.

Figure 6:
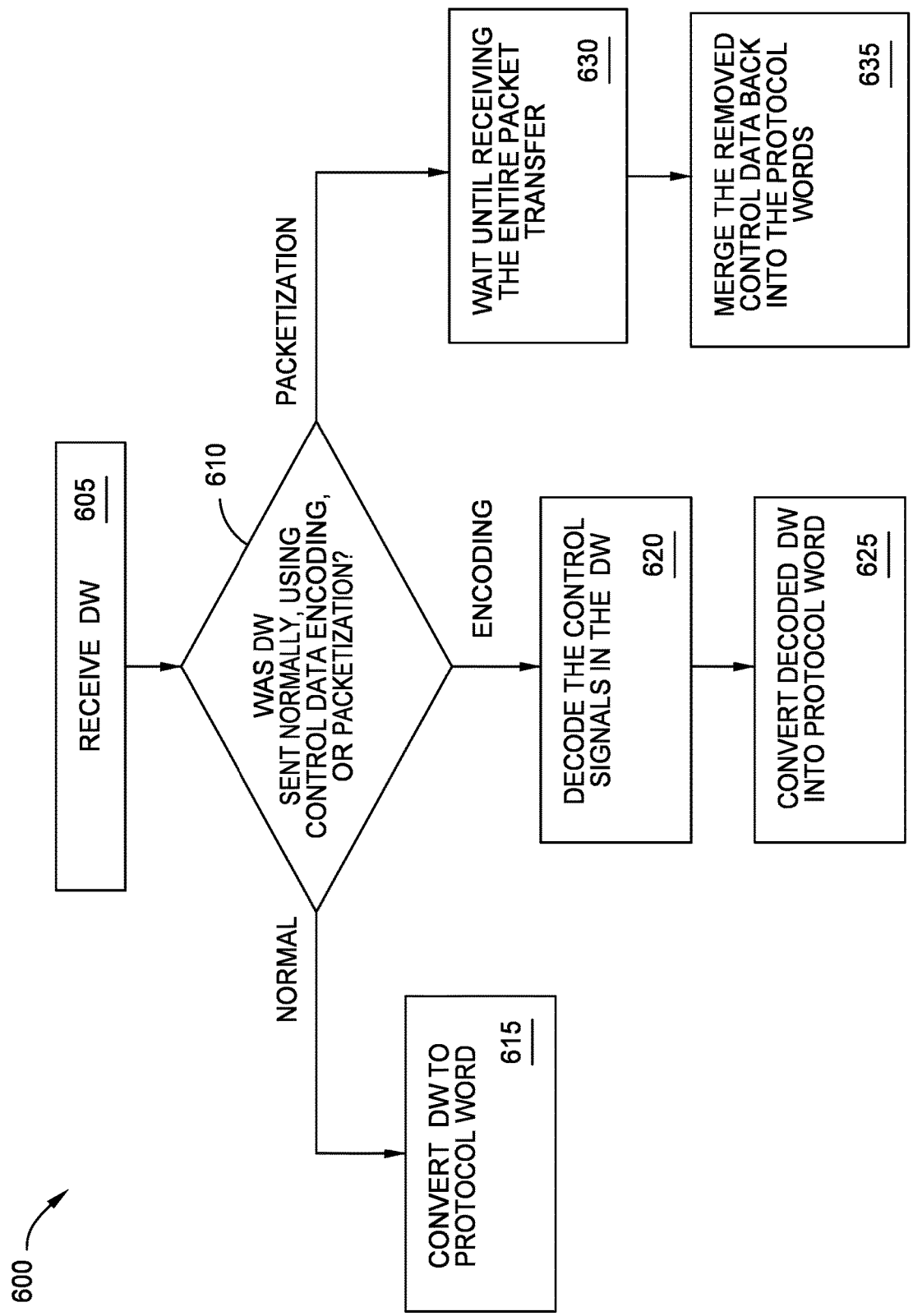
FIG. 6 is a flowchart for decoding control signals and performing reverse packetization on data words received at a C2C interface, according to an example.

FIG. 6 is a flowchart of a method 600 for decoding control signals and performing reverse packetization on data words received at a chip-to-chip interface, according to an example. While the method 400 describes the logic in a packetizer in a transmitter IC, the method 600 describes the logic in a packetizer in a receiver IC.

At block 605, the packetizer receives a DW from the PHY and link layers after being transmitted across the C2C interface. At block 610, the packetizer determines whether the DW was sent normally (i.e., without being encoded or packetized), using control data that was encoded, or by packetization. For example, the first DW in a transfer may have one or more bits used to indicate how the transmitting packetizer processed the protocol words (e.g., a direct one-to-one mapping with a DW, performed control data encoding, or packetization).

If the DW was sent normally (i.e., the original protocol word did not exceed the size of the DW), the method 600 proceeds to block 615 where the packetizer converts the DW back to the protocol word.

However, if the transmitting packetizer encoded the control data, the method 600 proceeds to block 620 where the receiving packetizer decodes the control data in the DW. That is, the packetizer can evaluate the encoded data and determine the location of the first valid byte location in the non-last protocol word in the transfer, or the location of the first invalid in the last protocol word in the transfer. Or the packetizer may evaluate a flag bit to determine when all the bytes of data in the control data for the transfer are valid.

At block 625, once decoded, the packetizer can use this information to convert the decoded DW into the original protocol word.

If the DW was packetized, the method 600 proceeds to block 630 where the receiving packetizer waits until receiving the entire packet transfer. For example, as shown in FIG. 3, the packetizer may know that each packetization transfer includes nine DWs, and as such, when detecting a DW is the first word in a transfer, the packetizer waits until receiving all nine DWs in that transfer.

At block 635, the packetizer merges the removed control data back in the protocol words. In this manner, the packetization process is reversed so that the original protocol words are reconstructed as shown by the last step of FIG. 3.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
  application circuitry;
  a chip-to-chip (C2C) interface; and
  a protocol layer connected between the application circuitry and the C2C interface, wherein the protocol layer is configured to:
    receive a plurality of protocol words from the application circuitry, to be transmitted on the C2C interface, wherein the plurality of protocol words comprises user data and control data and each of the plurality of protocol words exceeds a size of a data word (DW) supported by the C2C interface, and
    packetize the plurality of protocol words by:
      mapping subportions of the plurality of protocol words to separate DWs, wherein each of the subportions are equal to, or less than, the size of the DW, and
      generating at least one DW that contains the remaining portions of the plurality of protocol words not included in the subportions.

2. The integrated circuit of claim 1, wherein the remaining portions of the plurality of protocol words comprises the control data in the plurality of protocol words, wherein the subportions comprise the user data.

3. The integrated circuit of claim 2, wherein the at least one DW contains the control data from each of the plurality of protocol words but does not contain the user data from the plurality of protocol words.

4. The integrated circuit of claim 1, wherein the size of the DW is limited to a number of wires in the C2C interface.

5. The integrated circuit of claim 1, further comprising:
a link layer; and
physical (PHY) layer, wherein the link layer and PHY layer are coupled between the protocol layer and the C2C interface.

6. The integrated circuit of claim 1, wherein the protocol layer is configured to, before packetizing the plurality of protocol words, determine that at least one of the plurality of protocol words includes the control data that cannot be encoded to reduce the size of the at least one of the protocol words so it is equal to, or less than, the size of the DW.

7. The integrated circuit of claim 1, wherein the protocol layer is configured to:
receive a first protocol word from the application circuitry;
determine the control data in the first protocol word can be encoded to reduce the size of the first protocol word so it is equal to, or less than, the size of the DW; and
transmit the first protocol word, comprising the encoded control data, on the C2C interface without packetization.

8. The integrated circuit of claim 7, wherein the encoded control data indicates a location of an identifiable pattern in the first protocol word.

9. A system, comprising:
a first integrated circuit connected via a chip-to-chip (C2C) interface to a second integrated circuit,
wherein the first integrated circuit comprises a protocol layer connected between application circuitry and the C2C interface, wherein the protocol layer is configured to:
receive a plurality of protocol words from the application circuitry, to be transmitted on the C2C interface, wherein the plurality of protocol words comprises user data and control data and each of the plurality of protocol words exceeds a size of a data word (DW) supported by the C2C interface, and
packetize the plurality of protocol words by:
mapping subportions of the plurality of protocol words to separate DWs, wherein each of the subportions are equal to, or less than, the size of the DW, and
generating at least one DW that contains the remaining portions of the plurality of protocol words not included in the subportions.

10. The system of claim 9, wherein the remaining portions of the plurality of protocol words comprises the control data in the plurality of protocol words, wherein the subportions comprise the user data.

11. The system of claim 10, wherein the at least one DW contains the control data from each of the plurality of protocol words but does not contain the user data from the plurality of protocol words.

12. The system of claim 9, wherein the size of the DW is limited to a number of wires in the C2C interface.

13. The system of claim 9, further comprising:
a link layer; and
physical (PHY) layer, wherein the link layer and PHY layer are coupled between the protocol layer and the C2C interface.

14. The system of claim 9, wherein the protocol layer is configured to, before packetizing the plurality of protocol words, determine that at least one of the plurality of protocol words includes the control data that cannot be encoded to reduce the size of the at least one of the protocol words so it is equal to, or less than, the size of the DW.

15. The system of claim 9, wherein the protocol layer is configured to:
receive a first protocol word from the application circuitry;
determine the control data in the first protocol word can be encoded to reduce the size of the first protocol word so it is equal to, or less than, the size of the DW; and
transmit the first protocol word, comprising the encoded control data, on the C2C interface without packetization.

16. The system of claim 15, wherein the encoded control data indicates a location of an identifiable pattern in the first protocol word.

17. A method, comprising:
receiving, at a protocol layer in an integrated circuit, a plurality of protocol words to be transmitted on a chip-to-chip (C2C) interface, wherein the plurality of protocol words comprises user data and control data and each of the plurality of protocol words exceeds a size of a data word (DW) supported by the C2C interface, and
packetizing the plurality of protocol words by:
mapping subportions of the plurality of protocol words to separate DWs, wherein each of the subportions are equal to, or less than, the size of the DW, and
generating at least one DW that contains the remaining portions of the plurality of protocol words not included in the subportions.

18. The method of claim 17, wherein the remaining portions of the plurality of protocol words comprises the control data in the plurality of protocol words, wherein the subportions comprise the user data.

19. The method of claim 18, wherein the at least one DW contains the control data from each of the plurality of protocol words but does not contain the user data from the plurality of protocol words.

20. The method of claim 17, wherein the size of the DW is limited to a number of wires in the C2C interface.

* * * * *